United States Patent [19]

Beier et al.

[11] Patent Number: 4,921,573
[45] Date of Patent: May 1, 1990

[54] METHOD OF REGULATING THE SPECIFIC DISPERSION WORK FOR WASTE PAPER STOCK PREPARATION FOR PAPERMAKING

[75] Inventors: Dietmar Beier, Ravensburg-Obereschach; Jürgen Gutzeit, Ravensburg; Harald Selder, Schlier, all of Fed. Rep. of Germany

[73] Assignee: Sulzer-Escher Wyss GmbH, Ravensburg, Fed. Rep. of Germany

[21] Appl. No.: 234,675

[22] Filed: Aug. 22, 1988

[30] Foreign Application Priority Data

Aug. 29, 1987 [DE] Fed. Rep. of Germany ....... 3728890

[51] Int. Cl.$^5$ .............................................. D21C 5/02
[52] U.S. Cl. ....................................... 162/4; 162/198; 162/254
[58] Field of Search ................... 162/4, 198, 252, 253, 162/254, 258, DIG. 10, 11; 241/28, 34

[56] References Cited

U.S. PATENT DOCUMENTS

| | | | |
|---|---|---|---|
| 3,057,769 | 10/1962 | Sandberg | 162/4 |
| 3,957,572 | 5/1976 | Eriksson | 162/4 |
| 4,184,204 | 1/1980 | Flohr | 162/254 |
| 4,312,701 | 1/1982 | Campbell | 162/4 |
| 4,360,402 | 11/1982 | Ortner | 162/5 |

*Primary Examiner*—Karen M. Hastings
*Attorney, Agent, or Firm*—Werner W. Kleeman

[57] ABSTRACT

The method of dispersing a material containing waste paper by means of a dispersion apparatus and a dewatering machine, renders possible performing the material dispersion operation at essentially constant specific dispersion work even when encountering fluctuations of the raw material to be dispersed and of the dispersing process itself. For this purpose there is provided a regulating system which, with the aid of measured values or magnitudes derived from the dispersing process and predeterminate processing relationships, controls the addition of diluting water to the material to be dispersed at a location upstream of the dispersion apparatus.

15 Claims, 2 Drawing Sheets

METHOD OF REGULATING THE SPECIFIC DISPERSION WORK FOR WASTE PAPER STOCK PREPARATION FOR PAPERMAKING

BACKGROUND OF THE INVENTION

The present invention relates to a new and improved method of dispersing a material containing waste paper, wherein a dewatering machine is connected upstream or ahead of a dispersion apparatus or disperger.

When paper products are manufactured in modern papermaking machines, high requirements are placed upon the constancy or consistency of the quality, for instance, optical and technological constancy or regularity, of the material or stock supplied to the papermaking machine. While the constancy of quality of the material delivered to the papermaking machine is generally governable or controllable when primary raw materials or stock, such as fresh cellulose and mechanical wood pulp are used, quality fluctuations are a serious problem when waste paper is processed.

One of the objectives of the stock preparation process is to compensate as far as possible for the quality fluctuations emanating from the use of waste paper as the raw material. In no event can there be tolerated an increase of the quality fluctuations by virtue of the stock preparation process.

In modern installations for the preparation of waste paper, it is common to homogenize the waste paper stock subsequent to the stock preparation process. The equipment or installations used for this purpose are generally referred to as homogenizing or dispersion installations or machines. A measure of the degree of the dispersing effect or action is the energy density with which the material is processed or treated in the homogenizing or dispersion machine. At the same time, the paper-technological qualities of the finished stock are also determined by this treatment.

It is often necessary for operation reasons to operate the waste paper installation with different throughput quantities. This is associated with the adverse effect that during the dispersion process it is necessary to operate with continuously varying specific work, i.e. dispersion work, related to the actual material or stock throughput. The reason for this adverse effect is the non-linear relationship between the dispersion power or performance and the throughput of material through the dispersion apparatus or disperger. The specific dispersion work, in case of a throughput change of the material which is to dispersed, therefore only can be maintained constant when the dispersion power or performance is re-corrected.

SUMMARY OF THE INVENTION

Therefore with the foregoing in mind it is a primary object of the present invention to provide a new and improved method of dispersing a material containing waste paper, which does not suffer from the aforementioned drawbacks and shortcomings of the prior art methods.

Another and more specific object of the present invention aims at providing a new and improved method for dispersing a material containing waste paper by employing a regulating technique with the aid of a regulating or control system which renders possible maintaining essentially constant the specific dispersion work in the event of throughput variations of the material which is to be dispersed.

Yet a further significant object of the present invention aims at the provision of a new and improved method of regulating the specific dispersion work for the preparation of stock for use in a papermaking machine, which method can be effectively realized with relatively simple and economical means to provide continuous or continual essentially constant specific dispersion work and thus exceedingly good constancy or consistency in the processed material undergoing the dispersion operation or process.

Now in order to implement these and still further objects of the present invention which will become more readily apparent as the description proceeds, the method for dispersing a material containing waste paper --also sometimes simply referred to as a waste paper containing material--, among other things, is manifested by the features of dewatering in the dewatering machine the material to be dispersed to an extent greater than the method or process requires, then adding diluting water as a function of the specific dispersion work of the dispersion apparatus so as to adjust the stock density of the material upstream or ahead of the dispersion apparatus, in order to maintain essentially constant the specific dispersion work of the dispersion apparatus dictated by the composition of the material to be dispersed and for obtaining the desired quality of the material to be dispersed.

If the stock density of the material to be treated or processed is adjusted in accordance with the inventive method, then the desired constancy of the specific dispersion work is maintained in the event of material throughput variations.

BRIEF DESCRIPTION OF THE DRAWINGS

The invention will be better understood and objects other than those set forth above will become apparent when consideration is given to the following detailed description thereof. Such description makes reference to the annexed drawings.

DETAILED DESCRIPTION OF THE PREFERRED EMBODIMENTS

Figure 1:
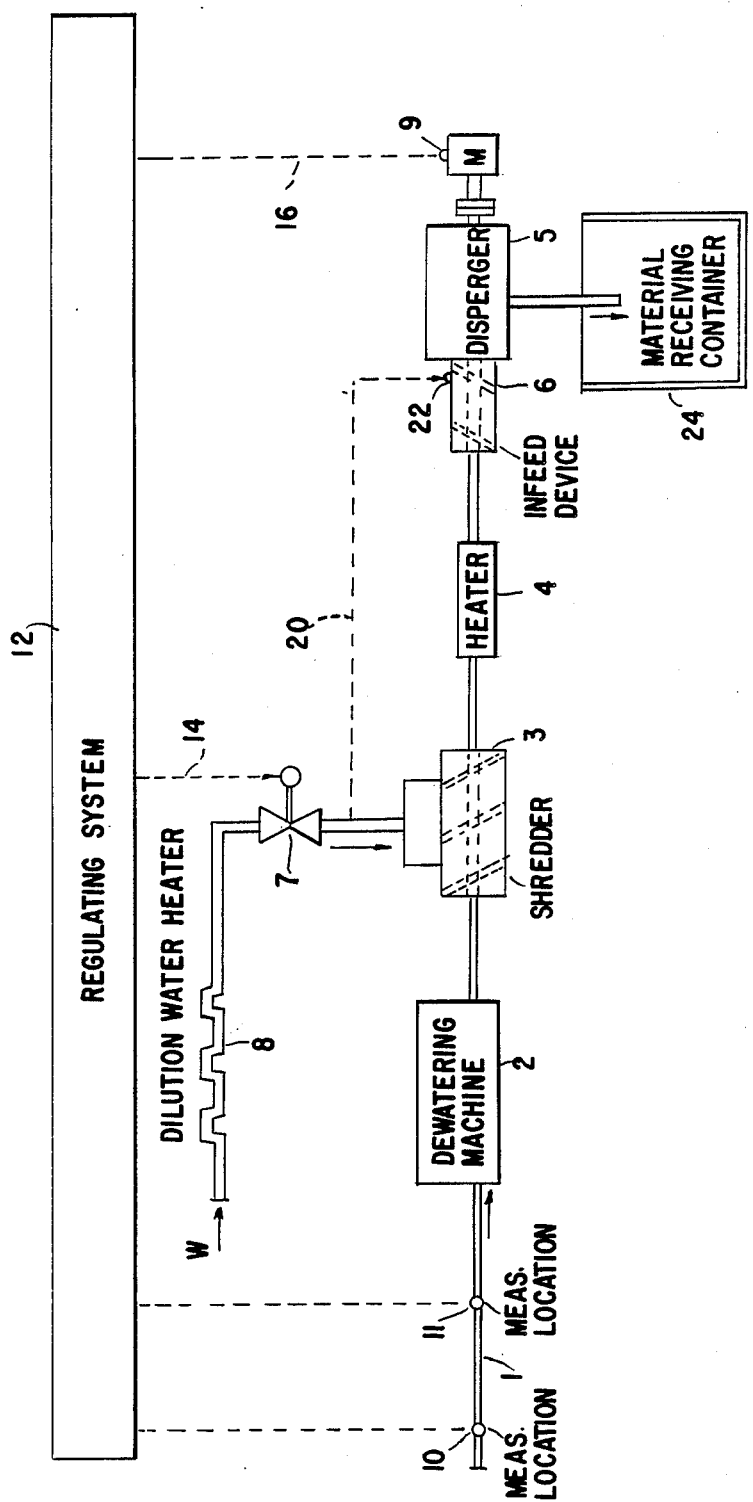
FIG. 1 schematically shows an installation for practicing the inventive method.

Describing now the drawings, it is to be understood that to simplify the showing thereof, only enough of the structure of the installation for realizing the inventive method or process of regulating the specific dispersion work—sometimes simply referred to as specific work—for stock preparation has been illustrated therein as is needed to enable one skilled in the art to readily understand the underlying principles and concepts of this invention. Turning now specifically to FIG. 1 of the drawings, the installation or plant illustrated therein by way of example and not limitation, will be seen to comprise a dewatering machine or apparatus 2 and a dispersion apparatus or disperger 5 arranged downstream or after the dewatering machine or apparatus 2 considered with respect to the material throughflow or flow direction. The dispersion apparatus or disperger 5 is in flow communication with a container or vat 24 for receiving the processed material.

When carrying out the inventive method, the material or stock to be dispersed or processed is guided or delivered through a line or conduit 1 into the dewatering machine 2. In this dewatering machine 2 the material is dewatered to a greater extent than would be necessary for the subsequent process or operation. The dewatered material is then fed to a suitable shredder, here in the form of a shredding worm 3, and arrives through a suitable heating device, here in the form of a heating worm 4, at the dispersion apparatus or disperger 5.

The adjustment or setting of the stock density can be accomplished by the addition of diluting water W through an adjustable valve 7 or equivalent inflow control means, for example, into the shredding worm 3 or, in accordance with a still more advantageous technique, at a location situated directly downstream of an infeed device or worm 6 or at a location of the housing or casing thereof near its outlet end and which infeed device or worm 6 is arranged upstream of the dispersion apparatus or disperger 5, as such has been generally schematically represented by the dotted line 20 in FIG. 1. In this regard it is advantageous if the diluting water W is added through an adjustable valve, as schematically indicated by reference numeral 22, directly upstream of the operating region or zone of the dispersion apparatus 5 as has been denoted by the line 20.

In order to avoid an unfavorable and uncontrolled temperature change or variation of the material to be dispersed, the diluting water W is raised in temperature or heated by means of, for example, a suitable heating device 8 to approximately the temperature at which the material is fed into the location where there is added the diluting water W.

The addition of the diluting water W is controlled or regulated after determining the dispersion power or performance at a measuring location 9 and the throughput of the material through the installation or plant. A suitable location for measuring the material throughput is upstream of the dewatering machine 2, i.e. at a measuring location or locations where the volume flow and the stock density of the material guided through the line or conduit 1 into the dewatering machine 2 are measured. The material throughput is calculated from these values. In the embodiment of Figure 1 these measuring locations or sites are designated by reference characters 10 and 11, wherein, for instance, location 10 measures such volume flow and location 11 stock density.

The adjustment or setting of the stock density of the material to be dispersed is carried out with a time lag which is dependent upon the distance between the measuring locations 10 and 11 arranged upstream of the dewatering machine 2 and the particular location contemplated for adding the diluting water W. Additionally, the stock transport or feed time between the location provided for the addition of the diluting water W and the dispersion apparatus or disperger 5 also must be considered in the regulating operation. Advantageously the described compensation of this dead-time lag is accomplished by means of a regulating system or loop 12 which is controlled by a suitable microprocessor. In the event the diluting water W is added directly upstream of the operating or work zone of the dispersion apparatus or disperger 5, then the above-mentioned time lag results only from the distance between the measuring locations 10 and 11 of the material throughput and the dispersion apparatus 5. It will be seen that the regulating system 12 acts via the control line 14 on the adjustable valve 7 controlling the addition of the dilution water and via the line 16 with the measuring location 9 associated with the drive motor M for the dispersion apparatus or disperger 5 and at which there is determined the dispersion power.

Figure 2:
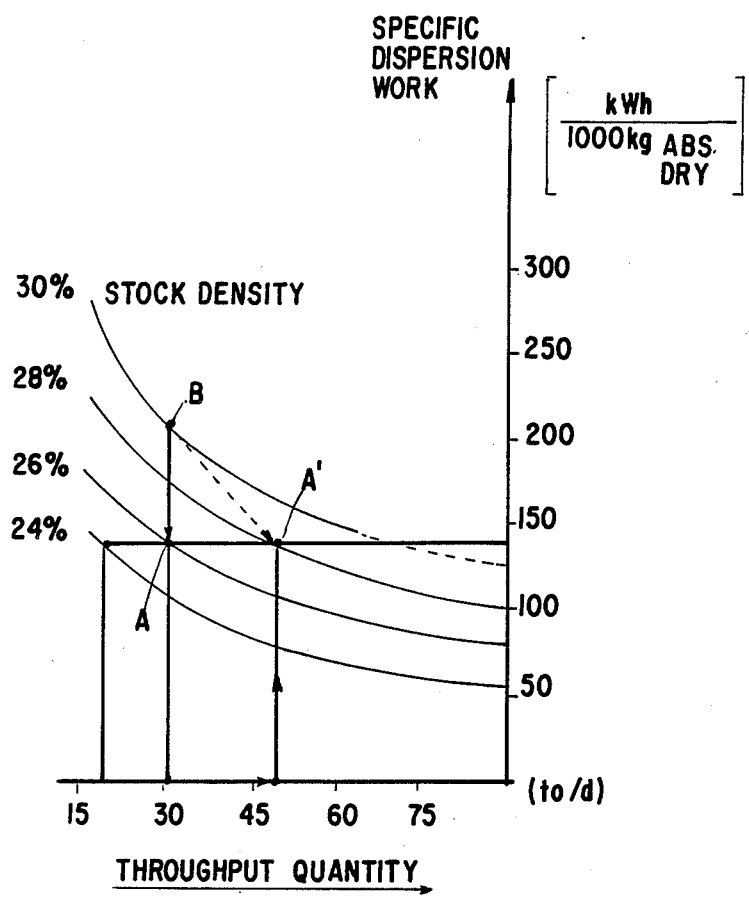
FIG. 2 is a graph depicting in graphical representation the operation of the dispersion apparatus according to the invention.

In FIG. 2, the operational behavior of the dispersion apparatus 5 is illustrated with the aid of a graph which, by way of an example, indicates the relationship between the throughput quantity (tons per day), the stock density and the specific work (specific dispersion work). By means of such graph, an example of the inventive method also can be explained, in which for an assumed throughput of 30 tons per day, a specific work of 135 kWh/1,000 kg absolute dry (abs. dry) should be accomplished. Under those circumstances there thus results a dispersion operating or working point A on the graph of FIG. 2. Above this dispersion operating or working point A, there is another point B likewise marked in the graph of FIG. 2. This point B indicates the extent to which more dewatering is carried out than would be necessary in the process, and this point B is the starting point for the dilution operation. From this illustration there results a correction path or route along which the diluting water W is added to the material to be treated or processed, whereby the stock density decreases to the value of the dispersion operating or working point A. Now in the event of a material throughput variation there is adjusted in accordance with the inventive method a stock density which differs from the heretofore prevailing dispersion operating or working point A, but lies below the starting point B for the dilution operation. At this adjusted or set stock density the dispersion is carried out with the same specific work, whereby naturally the limits of the installation, for instance maximum dispersion power, heating up and material transport, have to be considered. A thus located and new dispersion operating or working point is designated in FIG. 2 by reference character A'.

The inventive method also then can be utilized when there are fluctuations of other variables or values which influence the dispersion process. For example, it can be observed in practice that also when the material throughput is maintained constant, the dispersion power varies because of quality fluctuations of the employed waste paper. This would also lead to a change or variation of the specific dispersion work. By means of the inventive method, there is also ensured in this case a procedure or method which allows the operation to be accomplished with constant specific dispersion work. In this case, the specific dispersion work is the regulating or control magnitude, in other words, the specific dispersion work is maintained constant within the operating range of the regulating or control circuit irrespective of which influencing magnitudes caused the fluctuations to originate.

While there are shown and described present preferred embodiments of the invention, it is to be distinctly understood that the invention is not limited thereto, but may be otherwise variously embodied and practiced within the scope of the following claims. Accordingly,

What we claim is:

1. A method of dispersing a waste paper containing material in an installation provided with dewatering means for dewatering the material arranged upstream of dispersing means for dispersing the material viewed with respect to a predetermined direction of flow of the material through the installation, comprising the steps of:
- dewatering the material in said dewatering means to a greater extent then would be required for dispersing the material in the dispersing means;
- dispersing said material at a predetermined specific dispersing work in the dispersing means; and
- prior to said step of dispersing said material and after said dewatering step, adding diluting water to the material as a function of said predetermined specific dispersing work in said dispersing means and thereby adjusting the stock density of said material upstream of said dispersing means, in order to thereby maintain essentially constant said predetermined specific dispersing work of said dispersing means so as to achieve a desired quality of the dispersed material.

2. The method as defined in claim 1, further including the steps of:
- providing shredding means and a heating means between said dewatering means and said dispersing means;
- successively passing the material after effluxing from the dewatering means through the shredding means and the heating means to the dispersing means; and
- controlling the addition of the diluting water to the material as a function of said predetermined specific dispersing work in said dispersing means prior to entry of the material into the heating means.

3. The method as defined in claim 2, wherein:
- the step of controlling the addition of the diluting water as a function of said predetermined specific dispersing work in said dispersing means is accomplished by an adjustable valve.

4. The method as defined in claim 2, wherein:
- said step of adding the diluting water as a function of said predetermined specific dispersing work in said dispersing means entails supplying the diluting water into the shredding means.

5. The method as defined in claim 3, further including the steps of:
- providing an infeed device for the material directly upstream of the dispersing means; and
- said step of adding the diluting water to the material as a function of said predetermined specific dispersing work in said dispersing means is accomplished at least near the region of an outlet end of the infeed device arranged upstream of the dispersing means.

6. The method as defined in claim 5, further including the step of:
- using as the infeed device an infeed worm.

7. The method as defined in claim 1, further including the steps of:
- providing an infeed device for the material directly upstream of the dispersing means; and
- said step of adding the diluting water to the material as a function of said predetermined specific dispersing work in said dispersing means is accomplished directly following the infeed device arranged upstream of the dispersing means.

8. The method as defined in claim 7, further including the step of:
- using as the infeed device an infeed worm.

9. The method as defined in claim 1, wherein:
- said step of adding the diluting water to the material as a function of said predetermined specific dispersing work in said dispersing means is accomplished directly upstream of a predeterminate working zone of the dispersing means.

10. The method as defined in claim 9, wherein:
- the addition of the diluting water to the material as a function of said predetermined specific dispersing work in said dispersing means directly upstream of the working zone of the dispersing means is accomplished by an adjustable valve.

11. A method of dispersing a waste paper containing material in an installation provided with dewatering means for dewatering the material arranged upstream of dispersing means for dispersing the material viewed with respect to a predetermined direction of flow of the material through the installation, comprising the steps of:
- dewatering the material in said dewatering means to a greater extent than would be required for dispersing the material in the dispersing means;
- adding diluting water to the material and thereby adjusting the stock density of said material upstream of said dispersing means and downstream of said dewatering means, in order to maintain essentially constant specific dispersing work of said dispersing means dictated by the composition of said material so as to achieve a desired quality of the material;
- determining the dispersing power of the dispersing means;
- determining the throughput of the material through the installation; and
- controlling the addition of the diluting water as a function of the determined dispersing power and the material throughput.

12. The method as defined in claim 11, wherein:
- the step of determining the throughput of the material is accomplished by measuring the volume flow of the material and the stock density of the material at measuring locations upstream of the dewatering means; and
- said step of adding the diluting water to the material and thus adjusting the stock density of the material is accomplished with a time delay governed by the distance between the measuring locations determining the volume flow and stock density of the material and a location of addition of the diluting water and by the distance between said water addition location and the dispersing means.

13. The method as defined in claim 1, further including the step of:
- elevating the temperature of the diluting water so as to correspond approximately to the temperature of the material at a location where the diluting water is added.

14. A method of dispersing a waste paper containing material in an installation provided with dewatering means for dewatering the material arranged upstream of dispersing means for dispersing the throughput of the material viewed with respect to a predetermined direction of flow of the material through the installation, comprising the steps of:
- dewatering the material in said dewatering means to a greater extent than would be required for processing the material in the dispersing means;
- dispersing said material at a predetermined specific dispersing work in the dispersing means;
- prior to said step of dispersing said material and after said dewatering step, adding diluting water to the material as a function of said predetermined specific dispersing work in said dispersing means and thereby adjusting the stock density of said material upstream of said dispersing means, in order to thereby maintain essentially constant said predetermined specific dispersing work of said dispersing means so as to achieve a desired quality of the dispersed material; and during said step of adding diluting water, adding said diluting water in an amount which accounts for the effects of influencing magnitudes other than the throughput of the material upon the specific dispersing work in order to thereby maintain essentially constant said predetermined specific dispersing work of said dispersing means.

15. The method as defined in claim 14, wherein:

at least one of the influencing magnitudes whose effect is accounted for during the step of adding the diluting water, is fluctuations in the quality of the waste paper.

* * * * *